US010826634B2

(12) United States Patent
Carlock et al.

(10) Patent No.: US 10,826,634 B2
(45) Date of Patent: Nov. 3, 2020

(54) SYSTEM AND METHOD FOR IN-VEHICLE LIVE GUIDE GENERATION

(71) Applicant: Ibiquity Digital Corporation, Columbia, MD (US)

(72) Inventors: Jason Kyle Carlock, Rochester Hills, MI (US); Robert Michael Dillon, Mendham, NJ (US)

(73) Assignee: Ibiquity Digital Corporation, Columbia, MD (US)

( * ) Notice: Subject to any disclaimer, the term of this patent is extended or adjusted under 35 U.S.C. 154(b) by 0 days.

(21) Appl. No.: 16/402,306

(22) Filed: May 3, 2019

(65) Prior Publication Data

US 2019/0342020 A1 Nov. 7, 2019

Related U.S. Application Data

(60) Provisional application No. 62/667,210, filed on May 4, 2018.

(51) Int. Cl.

| | |
|---|---|
| ***G06F 17/00*** | (2019.01) |
| ***H04H 60/70*** | (2008.01) |
| ***H04H 60/73*** | (2008.01) |
| ***H04H 60/72*** | (2008.01) |
| ***H04H 60/90*** | (2008.01) |
| ***H04H 60/46*** | (2008.01) |

(52) U.S. Cl.

CPC ............ *H04H 60/70* (2013.01); *H04H 60/46* (2013.01); *H04H 60/72* (2013.01); *H04H 60/73* (2013.01); *H04H 60/90* (2013.01)

(58) Field of Classification Search

CPC ........ G06F 3/165; H04H 60/70; H04H 60/46; H04H 60/72; H04H 60/73; H04H 60/90

See application file for complete search history.

(56) References Cited

U.S. PATENT DOCUMENTS

| | | | |
|---|---|---|---|
| 7,565,294 | B2 | 7/2009 | Rhoads |
| 8,126,200 | B2 | 2/2012 | Rhoads |
| 8,230,343 | B2 | 7/2012 | Logan et al. |
| 2002/0120925 | A1 | 8/2002 | Logan |

(Continued)

OTHER PUBLICATIONS

"International Application Serial No. PCT/US2019/030536, International Search Report dated Jul. 11, 2019", 2 pgs.

(Continued)

*Primary Examiner* — Joseph Saunders, Jr.

(74) *Attorney, Agent, or Firm* — Schwegman Lundberg & Woessner, P.A.

(57) ABSTRACT

A system comprises an intermediate communication platform that provides an interface to an Internet network; and a first server including: a port operatively coupled to the intermediate communication platform, processing circuitry, and a service application for execution by the processor. The service application is configured to: receive audio content recognition information from a first radio receiver of multiple radio receivers via the intermediate communication platform, wherein the audio content recognition information identifies audio content received by the first receiver in a radio broadcast; determine audio metadata associated with the received audio content recognition information; and send the audio metadata to the multiple radio receivers via the intermediate communication platform.

24 Claims, 4 Drawing Sheets

(56) References Cited

U.S. PATENT DOCUMENTS

| | | | |
|---|---|---|---|
| 2003/0093790 | A1 | 5/2003 | Logan et al. |
| 2006/0242091 | A1 | 10/2006 | Jansky |
| 2007/0250194 | A1 | 10/2007 | Rhoads et al. |
| 2008/0052739 | A1 | 2/2008 | Logan |
| 2008/0092168 | A1 | 4/2008 | Logan et al. |
| 2009/0163137 | A1 * | 6/2009 | Capparelli ............. H04H 60/06 455/3.06 |
| 2010/0185306 | A1 | 7/2010 | Rhoads |
| 2013/0247082 | A1 | 9/2013 | Wang et al. |
| 2014/0157307 | A1 * | 6/2014 | Cox ................... H04N 21/4331 725/34 |
| 2014/0282658 | A1 | 9/2014 | Sinha et al. |
| 2015/0082338 | A1 | 3/2015 | Logan |
| 2015/0188975 | A1 | 7/2015 | Hansen et al. |
| 2015/0195054 | A1 | 7/2015 | Fischer et al. |
| 2015/0381297 | A1 | 12/2015 | Cepuran et al. |
| 2016/0182192 | A1 | 6/2016 | Milbar et al. |
| 2018/0026733 | A1 | 1/2018 | Yang et al. |

OTHER PUBLICATIONS

"International Application Serial No. PCT/US2019/030536, Written Opinion dated Jul. 11, 2019", 9 pgs.

"International Application Serial No. PCT US2019 030536, International Preliminary Report on Patentability dated Dec. 20, 2005", 33 pgs.

* cited by examiner

SYSTEM AND METHOD FOR IN-VEHICLE LIVE GUIDE GENERATION

CROSS-REFERENCE TO RELATED APPLICATION

This application claims the benefit of U.S. Provisional Patent Application No. 62/667,210, filed May 4, 2018, which is hereby incorporated by reference in its entirety.

TECHNICAL FIELD

The technology described in this patent document relates to systems and methods for providing supplemental data (e.g., metadata) that is associated with over-the-air radio broadcast signals.

BACKGROUND

Over-the-air radio broadcast signals are used to deliver a variety of programming content (e.g., audio, etc.) to radio receiver systems. Such over-the-air radio broadcast signals can include conventional AM (amplitude modulation) and FM (frequency modulation) analog broadcast signals, digital radio broadcast signals, or other broadcast signals. Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands.

Service data that includes multimedia programming can be included in IBOC DAB radio. The broadcast of the service data may be contracted by companies to include multimedia content associated with primary or main radio program content. However, service data may not always be available with the radio broadcast. In this case it may be desirable to identify the audio content being broadcast, and match service data with the audio content. Some current broadcast radio content information systems rely on "fingerprinting" of the audio content. However, these fingerprinting systems rely on a "one-to-one" system in which the interaction is limited to one radio receiver and one fingerprinting device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, embodiments of the in-vehicle live guide generation system and method obtain metadata for audio content playing in a single vehicle receiving a broadcast radio signal and share that audio metadata with a plurality of vehicles within a receiving area of the broadcast radio signal. For example, assume a vehicle is tuned to a radio station for which there is no real-time (or "live") data. The vehicle fingerprints the audio content and sends a request for audio content identification to a server via an application programming interface (API). The server communicates with a fingerprinting server, receives a response, updates the primary server, and sends "live" data out to all vehicles in the area. All radio clients in the area that are connected to the primary server are provided with the live data, essentially becoming a one-to-many system.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
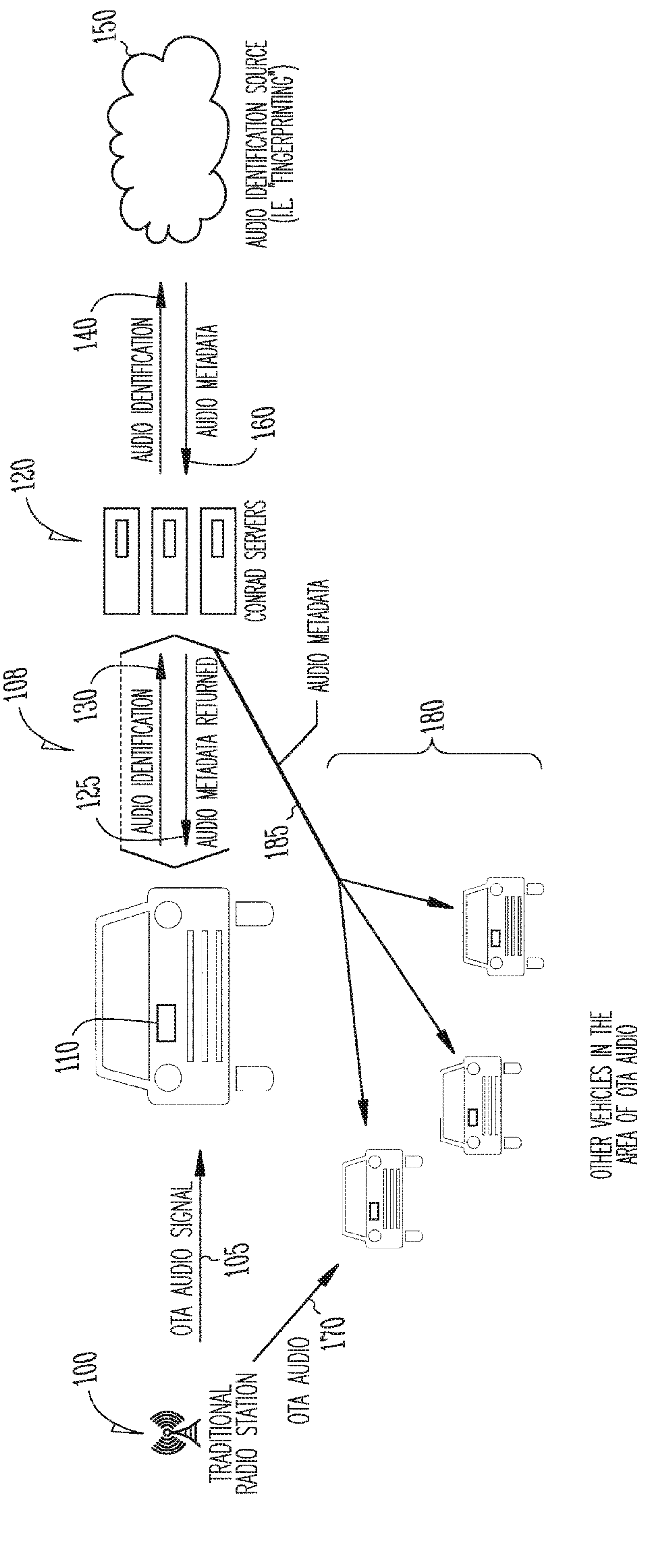
FIG. 1 is block diagram illustrating an overview of embodiments of the in-vehicle live guide generation system.

In the following description of embodiments of an in-vehicle live guide generation system and method, reference is made to the accompanying drawings. These drawings shown by way of illustration specific examples of how embodiments of the in-vehicle live guide generation system and method may be practiced. It is understood that other embodiments may be utilized, and structural changes may be made without departing from the scope of the claimed subject matter.

Over-the-air radio broadcast signals are commonly used to deliver a variety of programming content (e.g., audio, etc.) to radio receiver systems. Main program service (MPS) data and supplemental program service (SPS) data can be provided to radio broadcast receiver systems. Metadata associated with the programming content can be delivered in the MPS data or SPS data via the over-the-air radio broadcast signals. The metadata can be included in a sub-carrier of the main radio signal. In IBOC radio, the radio broadcast can be a hybrid radio signal that may include a streamed analog broadcast and a digital audio broadcast. Sub-carriers of the main channel broadcast can include digital information such as text or numeric information, and the metadata can be included in the digital information of the sub-carriers. Thus, a hybrid over-the-air radio broadcast can include an analog audio broadcast, a digital audio broadcast, and other text and numeric digital information such as metadata streamed with the over-the-air broadcast. The programming content may be broadcast according to the DAB standard, the digital radio mondiale (DRM) standard, radio data system (RDS) protocol, or the radio broadcast data system (RBDS) protocol.

The metadata can include both "static" metadata and "dynamic" metadata. Static metadata changes infrequently or does not change. The static metadata may include the radio station's call sign, name, logo (e.g., higher or lower logo resolutions), slogan, station format, station genre, language, web page uniform resource locator (URL), URL for social media (e.g., Facebook, Twitter), phone number, short message service (SMS) number, SMS short code, program identification (PI) code, country, or other information.

Dynamic metadata changes relatively frequently. The dynamic metadata may include a song name, artist name, album name, artist image (e.g., related to content currently being played on the broadcast), advertisements, enhanced advertisements (e.g., title, tag line, image, phone number, SMS number, URL, search terms), program schedules (image, timeframe, title, artist name, DJ name, phone number, URL), service following data, or other information. When the radio receiver system is receiving an over-the-air radio broadcast signal from a particular radio station, the receiver system may receive both static metadata and dynamic metadata.

Another approach to provide service data is to combine broadcast radio information with Internet Protocol (IP) delivered content to provide an enhanced user experience. An example of this type of service is DTS® Connected Radio™ service, which combines over-the-air analog/digital AM/FM radio with Internet Protocol (IP) delivered content. The DTS Connected Radio services receives dynamic metadata-such as artist information and song title, on-air radio program information and station contact information-directly from local radio broadcasters, which is then paired with IP-delivered content, and displayed in vehicles. The DTS Connected Radio service supports all global broadcast standards including analog, DAB, DAB+ and HD Radio™. The radio receivers of the vehicles integrate data from Internet services with broadcast audio to create a rich media experience. One of the Internet services provided is information about what the radio stations are currently playing and have played.

The coordination of the radio broadcast content and the IP-delivered content requires cooperation of the radio broadcaster. However, not all radio broadcasters are willing to pay for a service that integrates IP-delivered content with the radio broadcast. The result is that the combined IP/broadcast content can be spotty as the vehicle radio receivers move through different locations. Thus, generating a live or real time guide of radio broadcast options for a vehicle can be challenging.

As explained previously herein, the radio broadcast can include a digital audio file of the audio content being played. To determine the live audio metadata, a vehicle radio receiver could include an application that generates an audio file identifier using a segment of the digital audio file. The audio file identifier can include a digital fingerprint or digital watermark of the audio file. The audio identification could be transmitted from the vehicle to a server that performs automatic content recognition (ACR) can be performed to identify content of the over-the-air radio broadcast. Live metadata could then be returned to the vehicle receiver. However, this process would not provide sufficient metadata to generate a complete live broadcast guide for the vehicle receiver. Live metadata would not be available for broadcasts available from other stations to which the vehicle radio receiver is not tuned. Neither would information be available on the history of what was played but not tuned to by the radio receiver of the vehicle. A better approach is to use a crowd-sourcing technique to generate the complete live broadcast guide.

In a crowd-sourcing approach, an in-vehicle live guide generation system obtains metadata for audio content playing in a single vehicle using a radio receiver receiving a broadcast radio signal, and that audio metadata is shared with multiple vehicles within a receiving area of the broadcast radio signal.

If the radio receiver of a DTS Connected Radio-enabled vehicle is tuned to a station for which DTS Connected Radio does not have "live" or real-time metadata an audio fingerprinting methodology is routed through the DTS Connected Radio server via an application programming interface (API). The radio receiver of the vehicle fingerprints and sends a request to a DTS Connected Radio server for audio content identification. The DTS Connected Radio server may communicate with a fingerprinting server, receive a response from the fingerprinting server that updates the DTS Connected Radio server, and send "live" metadata out to all vehicles in the area.

By way of example, assume a vehicle is located in geographical area X, requesting data for station Y from the DTS Connected Radio server. The server responds that "live" data not available for the requested station. This lack of data may be contributable to a number of factors. The DTS Connected Radio-enabled vehicle has audio fingerprinting technology software included in the radio receiver. The radio receiver of the vehicle fingerprints the audio that is currently playing and sends that information to the DTS Connected Radio server. This information can include any combination of vehicle location, current station being listened to, and the fingerprint data. The server may send the fingerprint data to a fingerprinting service.

The fingerprinting service sends back data identifying the audio content being listened to through the fingerprint data. The DTS Connected Radio server updates the station information (and notes which content is currently being played) and notifies the original vehicle that "live" data is now available. All DTS Connected Radio clients in the area are also provided with the live data, essentially becoming a one-to-many system. This allows the system and method to gather and obtain real time "now playing" information for any geographic region where DTS Connected Radio-enabled vehicles are deployed.

Currently, fingerprinting systems rely on a one-to-one model, in which a request is received from one source and information is provided back to the one source from the fingerprinting system. In the crowd-sourcing approach, this one-to-one service can be used but then the data can be made available to all other vehicles utilizing the DTS Connected Radio server in the same area. Each vehicle can be placed into a "rotation" thus spreading the data consumption of determining the "now playing" content across all vehicles tuned to a specific station in a geographic area. This serves to improve the user experiencing of the DTS Connected Radio system by increasing the number of stations for which the system has "now playing" information.

FIG. 1 is block diagram illustrating an overview of embodiments of the in-vehicle live guide generation system. A traditional broadcast radio station 100 transmits an over-the-air (OTA) audio signal 105 to the radio receiver 110 of a vehicle. The radio receiver 100 is one of many radio receivers in vehicles 180 in the broadcast area of the radio broadcast. The OTA audio signal 105 can be an analog audio signal, a digital audio signal, or a hybrid audio signal. The radio receiver 110 of the vehicle is receiving both an OTA audio signal 105 and an IP stream. The IP stream is received via an intermediate communication platform 108 from one or more servers 120. The intermediate communication platform 108 may be a cellular phone network or a telematics network.

Figure 2:
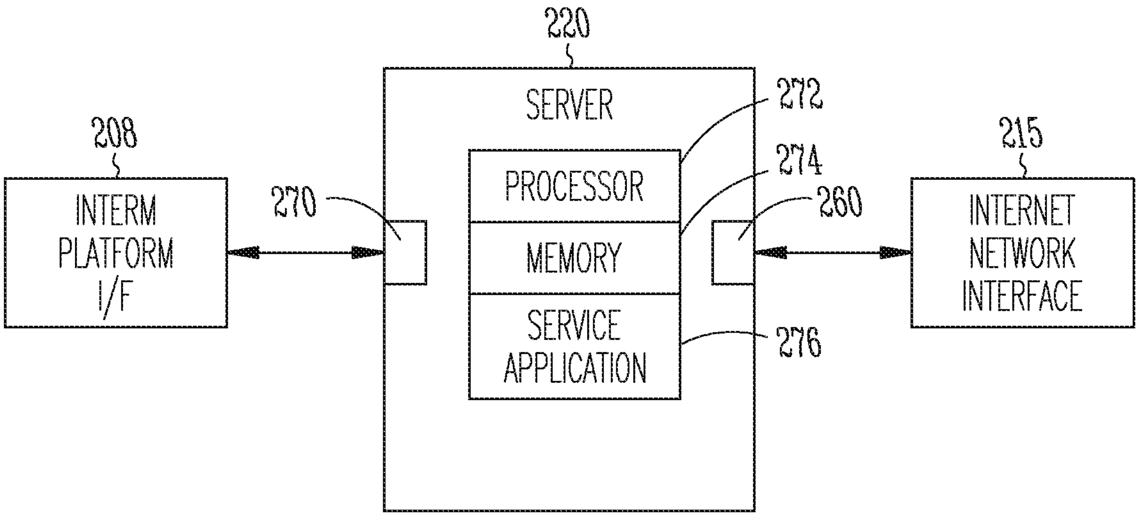
FIG. 2 is a block diagram of an example of a server to provide an Internet Protocol stream to radio receivers.

FIG. 2 is a block diagram of an example of a server to provide an IP stream to radio receivers. The server 220 includes a processor 272, a memory 274, and a service application 276 for execution by the processor 272. The service application 276 can comprise software that operates using the operating system software of the server 220. The server 220 includes a port 270 operatively coupled to an interface to the intermediate communication platform 108.

Returning to FIG. 1, the in-vehicle live guide generation system determines whether metadata about the audio content (audio metadata) being broadcast by station 100 is available. For example, the audio metadata may be available according to a schedule, and the server may push the audio metadata to the radio receivers according to the schedule. If audio metadata is available, then the one or more servers 120 returns the audio metadata 125 to the radio receiver 110 of the vehicle for display. The one or more servers may be DTS Connected Radio servers. If the server 120, however, does not have any audio metadata about the audio content being broadcast by the station 100, then the radio receiver 110 of the vehicle generates audio content recognition information for the audio.

The audio content recognition information may be an audio identification such as a digital fingerprint, digital watermark, or digital signature of the audio content. The radio receiver 110 then sends the audio content recognition information to the server 120. In some embodiments, the radio receiver 110 may generate and send the audio identification 130 when determining that the radio receiver does not have metadata for the current broadcast, and metadata for the broadcast is not received via the intermediate platform.

The server 120 receives the audio content recognition information from the radio receiver 110 via the intermediate communication platform 108. The service application of the server 120 determines the audio metadata associated with the received audio content recognition information. The server 120 sends audio metadata 125 identifying the audio content as well as associated metadata to the radio receiver 110 as well as the other radio receivers of the other vehicles 180 in the broadcast area. In this way, the one audio identification 130 sent by radio receiver 110 results in audio metadata being provided to all the other vehicles in the broadcast receiving area thereby crowd sourcing the audio metadata to the all the vehicles.

In some embodiments, geographical location information (e.g., GPS coordinates) is sent to the server from the radio receiver 110 with the audio content recognition information. The service application of the server 120 determines the radio receivers to which to send the audio metadata using the geographical information. The audio metadata can include now-playing information for the radio broadcast. The radio receivers of the vehicles can include the now-playing information in the live guide for radio broadcasts in the area. Other radio receivers in the area can also provide other audio identification information to the server 120. The audio identification information may identify audio content currently being broadcast by other radio stations in the broadcast area. The service application of the server 120 distributes the audio metadata related to the audio content. The radio receivers of the vehicles in the area then incorporate the metadata into a live guide "across the dial" for the content being broadcast by radio stations in the area.

This also allows the guide to include play history of the audio content previously broadcast in the area by radio stations. The history information may be stored in the radio receivers or provided by the server 120 when a vehicle enters the broadcasting area. The service application of the server 120 may determine that a vehicle has entered a specific broadcasting area when the server 120 receives one or both of an audio content identifier or geographical information from the radio receiver of the vehicle. The service application of the server 120 may service the audio content information from the multiple radio receivers in a rotation or other specified priority so that the processing and communication is shared or sourced among the radio receivers in the broadcasting area.

In some embodiments, the server stores the audio metadata in server memory. For example, the audio metadata may be stored in the memory in association with audio file fingerprint or watermark. The service application of the server 120 determines the audio metadata by retrieving the audio metadata from the memory using the audio content recognition information.

In some embodiments, the server 120 receives the audio metadata from a separate device (e.g., another server) via a communication network. The communication network may be the intermediate communication platform 108 or another communication network. As shown in the example of FIG. 2, the server 220 can include a second port 260 operatively coupled to an Internet network interface 215. In certain embodiments, the Internet network interface 215 includes an Internet access point (e.g., a modem), and the port 260 can include (among other options) a communication (COMM) port, or a universal serial bus (USB) port.

As shown in the example of FIG. 1, the server 120 receives the audio metadata from an audio identification source 150. The service application of the server 120 determines the audio metadata by forwarding the audio identification 140 to the audio identification source 150 for identification of the audio content and to receive the audio metadata from the audio identification source 150. The audio identification source 150 is shown as residing in the cloud in FIG. 1. The term "cloud" is used herein to refer to a hardware abstraction. Instead of one dedicated server processing the digital audio file and returning the audio file identifier (e.g., the digital fingerprint or the digital watermark), sending the digital audio file to the cloud can include sending the digital audio file to a data center or processing center. The actual server used to process the digital audio file is interchangeable at the data center or processing center.

The audio metadata 160 for the identified audio content as well as associated metadata is sent back to the server 120 from the audio identification source 150. The server 120 is updated with this audio metadata. The audio metadata 160 and associated metadata (if any) relating to the audio content currently playing on the station 100 is distributed 185 to the radio receiver 110 and the radio receivers of the other vehicles 180 using the intermediate communication platform 108.

In some embodiments, the service application of the server 120 can determine an end time of the audio content using the audio content recognition information. If the service application determines the end time of the audio content it also can determine the start time that the next audio content will play. The service application can change the audio metadata sent to the multiple radio receivers based on the end time. The service application may also record the history of recently played audio content (e.g., songs played) for the radio receiver, and a history of the plays of audio content (e.g., a song) by the radio receiver.

In some embodiments, the service application of the server 120 determines the broadcasting area that a vehicle is in and sends a tuning recommendation to the radio receiver of the vehicle. The service application may determine the broadcasting area of the radio receiver using signal strength data for the information received from the radio receiver. The service application may determine the broadcasting area of the radio receiver using geographical location information received from the radio receiver. The service application may send a tuning recommendation via the intermediate platform to a radio receiver based on the determined broadcasting area of the receiver. The tuning recommendation may be based on the history determined for the radio receiver. The service application may compare audio content playing or to be played in the broadcasting area with the paying history of the radio receiver and recommend a radio station to the radio receiver.

It may be desirable for broadcast radio stations, advertisers, and copyright holders to have a means to independently track the play of audio content of radio broadcasts. The data collected from radio receivers can be used to determine which copyright owner's material has been played for royalty purposes. For advertisers, it can determine or verify how many times an advertisement was run or can be used by advertisers to reallocate advertising resources. It can also be aggregated into anonymous listener behavior such as popular songs, station "ratings", etc.

To collect the data, the service application may use the server memory to record radio reception information or receiver tuning information identified by the audio content recognition information. In certain embodiments, the record radio reception information or receiver tuning information is sent by the radio receiver and stored in the server memory. The collected data may include record radio reception information including one or more of an audio content identifier, a date of reception of the audio content identifier, geographical location information of the first radio receiver; and radio station identification information.

Figure 3:
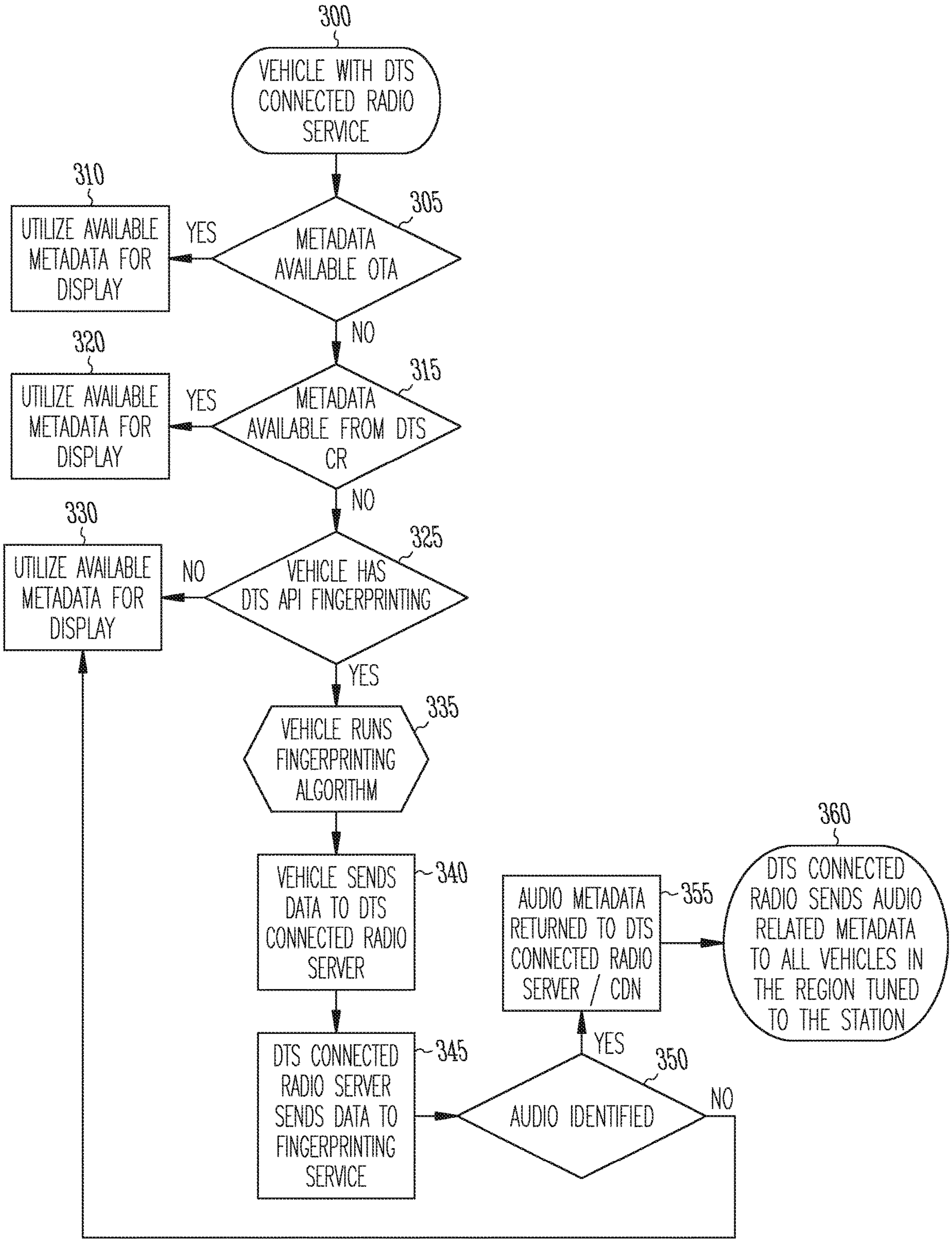
FIG. 3 is a flowchart illustrating an overview of embodiments of a method of generating an in-vehicle live guide.

FIG. 3 is a flowchart illustrating an overview of embodiments of a method of generating an in-vehicle live guide. The method begins at 300 with a vehicle that is in contact with the DTS Connected Radio system. The method may be performed using processing circuitry of a radio receiver included in the vehicle. At 305, a determination is made as to whether metadata relating to the audio content playing on the radio receiver in the vehicle (and received from a broadcast radio station or IP stream) is available. If metadata is available, at 310 the available metadata is displayed to a user in the vehicle.

If metadata is not available, the method proceeds at 315 to determining whether the metadata about the audio content is available from the DTS Connected Radio server. If metadata is available from the server, at 320 the available metadata from the DTS Connected Radio server is displayed to the user in the vehicle. If metadata is not available from the server, at 325 the method determines whether the radio receiver of the vehicle has a fingerprinting API installed. If a fingerprinting API is not installed in the receiver, at 330 the method utilizes the available metadata from the station and displays that metadata for the user in the vehicle.

If the fingerprinting API is installed, at 335 the radio receiver in the vehicle runs the fingerprinting technique to fingerprint the audio content. At 340, the fingerprint data is sent from the vehicle to the DTS Connected Radio server. The DTS Connected Radio server in turn sends the fingerprint data to a fingerprinting service.

If the fingerprinting service cannot identify the audio content from the fingerprint data, at 330 the available metadata from the station is used and the radio receiver displays that metadata for the user in the vehicle. If the fingerprinting service can identify the audio content, at 355 the metadata associated with that audio content is returned to the DTS Connected Radio server and the server is updated. At 360, the DTS Connected Radio server sends out the metadata associated with the audio content to all vehicles in communication with the DTS Connected Radio server and tuned to the station on which the audio content is currently be played. In alternate embodiments, the DTS Connected Radio server sends out the metadata to all vehicles in communication with the DTS Connected Radio server, regardless of which station to which they are tuned.

Figure 4:
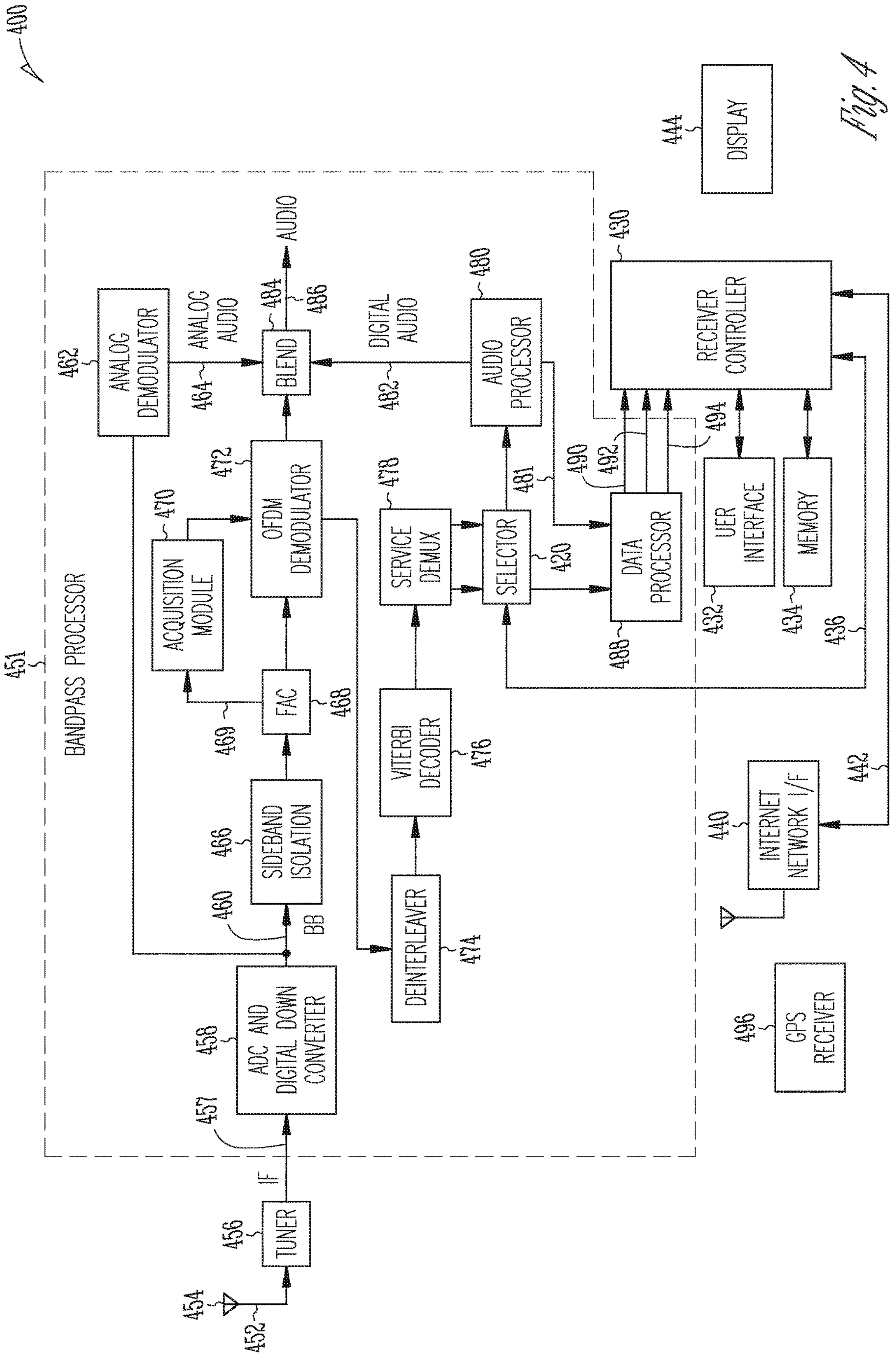
FIG. 4 is a block diagram of portions of an example of a DTS Connected Radio receiver.

FIG. 4 is a block diagram of portions of an example DTS Connected Radio receiver. The radio receiver 400 may be the radio receiver 110 of a vehicle shown in the example of FIG. 1. The radio receiver 400 includes a wireless Internet network interface 440 for receiving metadata via wireless IP and other components for receiving over-the-air radio broadcast signals. The Internet network interface 440 and receiver controller 430 may be collectively referred to as a wireless internet protocol hardware communication module of the radio receiver.

The radio receiver 400 includes radio frequency (RF) receiver circuitry including tuner 456 that has an input 452 connected to an antenna 454. The antenna 454, tuner 456, and baseband processor 451 may be collectively referred to as an over-the-air radio broadcast hardware communication module of the radio receiver. The RF circuitry is configured to receive audio broadcast signal that includes a digital audio file.

Within the baseband processor 451, an intermediate frequency signal 457 from the tuner 456 is provided to an analog-to-digital converter and digital down converter 458 to produce a baseband signal at output 460 comprising a series of complex signal samples. The signal samples are complex in that each sample comprises a "real" component and an "imaginary" component. An analog demodulator 462 demodulates the analog modulated portion of the baseband signal to produce an analog audio signal on line 464. The digitally modulated portion of the sampled baseband signal is filtered by isolation filter 466, which has a pass-band frequency response comprising the collective set of subcarriers ft-fn present in the received OFDM signal. First adjacent canceller (FAC) 468 suppresses the effects of a first-adjacent interferer. Complex signal 469 is routed to the input of acquisition module 470, which acquires or recovers OFDM symbol timing offset/error and carrier frequency offset/error from the received OFDM symbols as represented in received complex signal 469. Acquisition module 470 develops a symbol timing offset Δt and carrier frequency offset Δf, as well as status and control information. The signal is then demodulated (block 472) to demodulate the digitally modulated portion of the baseband signal. The digital signal is de-interleaved by a de-interleaver 474, and decoded by a Viterbi decoder 476. A service de-multiplexer 478 separates main and supplemental program signals from data signals. The supplemental program signals may include a digital audio file received in an IBOC DAB radio broadcast signal.

An audio processor 480 processes received signals to produce an audio signal on line 482 and MPSD/SPSD 481. In embodiments, analog and main digital audio signals are blended as shown in block 484, or the supplemental program signal is passed through, to produce an audio output on line 486. A data processor 488 processes received data signals and produces data output signals on lines 490, 492, and 494. The data lines 490, 492, and 494 may be multiplexed together onto a suitable bus such as an $I^2c$, SPI, UART, or USB. The data signals can include, for example, data representing the metadata to be rendered at the radio receiver.

The wireless Internet network interface may be managed by the receiver controller 430. As illustrated in FIG. 4, the Internet network interface 440 and the receiver controller 430 are operatively coupled via a line 442, and data transmitted between the Internet network interface 440 and the receiver controller 430 is sent over this line 442. A selector 420 may connect to receiver controller 430 via line 436 to select specific data received from the Internet network interface 440. The data may include metadata (e.g., text, images, video, etc.), and may be rendered at substantially the same time that primary or supplemental programming content received over-the-air in the IBOC DAB radio signal is rendered.

The receiver controller 430 receives and processes the data signals. The receiver controller 430 may include a microcontroller that is operatively coupled to the user interface 432 and memory 434. The microcontroller may be an 8-bit RISC microprocessor, an advanced RISC machine 32-bit microprocessor, or any other suitable microprocessor or microcontroller. Additionally, a portion or all of the functions of the receiver controller 430 could be performed in a baseband processor (e.g., the audio processor 480 and/or data processor 488). The user interface 432 may include input/output (I/O) processor that controls the display, which may be any suitable visual display such as an LCD or LED display. In certain embodiments, the user interface 432 may also control user input components via a touch-screen display. In certain embodiments, the user interface 432 may also control user input from a keyboard, dials, knobs or other suitable inputs. The memory 434 may include any suitable data storage medium such as RAM, Flash ROM (e.g., an SD memory card), and/or a hard disk drive. The radio receiver 400 may also include a GPS receiver 496 to receive GPS coordinates.

The processing circuitry of the receiver controller 430 is configured to perform instructions included in an API installed in the radio receiver. As explained previously herein, a digital audio file can be received via the RF receiver circuitry. The digital audio file can be processed as SPS audio, SPS data, or AAS data. The API is configured to determine audio content recognition information using the digital audio file. The audio content recognition information can include an audio identification such as a digital audio file fingerprint, a digital audio file watermark, or digital audio file signature. As explained previously herein, the API is configured to generate the audio identification when audio metadata is missing or unavailable for the current radio broadcast being played by the radio receiver or when the digital audio file is received.

The API sends the determined audio content recognition information to an audio metadata service application via the Internet network interface. The information is processed by the service application, and API receives audio metadata associated with the digital audio file via the Internet network interface. The radio receiver includes a display 444. The API presents information included in the received metadata using the display 444 of the radio receiver.

The API may send one or both of geographical location information (e.g., GPS coordinates) and radio station information audio content recognition information to the service application. The API may receive now-playing information from the service application via the Internet network interface. The API presents current tuning information using the display using the received now-playing information. Audio content recognition information from radio receivers of multiple vehicles may be aggregated into a live in-vehicle broadcast guide and presented to the user on the display 444. In some embodiments, the API receives a tuning recommendation in response to the sending of the audio content recognition information. The API presents the tuning recommendation using the display.

In addition to receiving the audio metadata, in some embodiments, the radio receiver 400 may receive an additional digital audio file via the Internet network interface 440. The additional digital audio file may be received from a radio broadcast system in response to sending the audio content recognition information. For example, the additional digital audio file may be an advertisement related to the audio content identified in the audio content recognition information. The receiver controller 430 may initiate play of the additional digital audio file after the receiver finished playing the current audio file.

The systems, devices, and methods described permit metadata to be provided to a radio receiver of a vehicle when the metadata is unavailable from the radio broadcaster or other third-party service. The unavailable metadata is identified using through crowd sourcing so that one radio receiver is not burdened with providing the audio identification used to retrieve the metadata. The metadata is then sent from a central location to all the radio receivers in the broadcast area. The radio receivers of the vehicles can be placed in a rotation or other distribution so that data consumption is spread among the vehicles in the broadcast area.

I. Alternate Embodiments and Exemplary Operating Environment

Example 1 includes subject matter (such as a system to provide audio metadata to radio receivers in real time) comprising an intermediate communication platform that provides an interface to an Internet network; and a first server including: a port operatively coupled to the intermediate communication platform, processing circuitry, and a service application for execution by the processor. The service application is configured to receive audio content recognition information from a first radio receiver of multiple radio receivers via the intermediate communication platform, wherein the audio content recognition information identifies audio content received by the first receiver in a radio broadcast; determine audio metadata associated with the received audio content recognition information; and send the audio metadata to the multiple radio receivers via the intermediate communication platform.

In Example 2, the subject matter of Example 1 optionally includes a service application configured to receive geographical location information from the first radio receiver, and the multiple radio receivers are radio receivers located in a same receiving area of the radio broadcast as the first radio receiver.

In Example 3, the subject matter of one or both of Examples 1 and 2 optionally includes a service application configured to receive radio station information from the first radio receiver in association with the audio content recognition information; and send audio metadata to the multiple radio receivers that includes now-playing information for a radio station.

In Example 4, the subject matter of one or any combination of Examples 1-3 optionally includes a second server configured to store the audio metadata; and a communication network operatively coupled to the first and second servers; wherein the service application of the first server is configured to determine the audio metadata by forwarding the audio content recognition information to the second server via the communication network and receive the audio metadata from the second server.

In Example 5, the subject matter of one or any combination of Examples 1-4 optionally includes the first server including a memory configured to store the audio metadata, and a service application configured to determine the audio metadata by retrieving the audio metadata from the memory using the audio content recognition information.

In Example 6, the subject matter of one or any combination of Examples 1-5 optionally includes a service application configured to determine audio metadata using audio content recognition information received from the multiple radio receivers according to a specified priority.

In Example 7, the subject matter of one or any combination of Examples 1-6 optionally includes a service application configured to determine an end time of the audio content using the audio content recognition information and change the audio metadata sent to the multiple radio receivers based on the end time.

In Example 8, the subject matter of one or any combination of Examples 1-7 optionally includes a service application configured to receive geographical location information from the first radio receiver; determine signal strength using one or both of the received audio content recognition information and the received geographical location information; and send a tuning recommendation to the multiple radio receivers according to the determined signal strength.

In Example 9, the subject matter of one or any combination of Examples 1-8 optionally includes the first server including a memory, and a service application configured to use the memory to record radio reception information for the audio content identified by the audio content recognition information.

In Example 10, the subject matter of one or any combination of Examples 1-9 optionally includes a service application configured to record radio reception information including one or more of: an identifier of the audio content, a date of reception of the audio content recognition information, geographical location information of the first radio receiver, and radio station identification information.

In Example 11, the subject matter of one or any combination of Examples 1-10 optionally includes the first server including a memory, and a service application configured to use the memory to record radio receiver tuning information for the audio content identified by the audio content recognition information.

In Example 12, the subject matter of one or any combination of Examples 1-11 optionally includes a service application is configured to send a tuning recommendation to the first radio receiver via the intermediate communication platform according to the radio receiver tuning information.

In Example 13, the subject matter of one or any combination of Examples 1-12 optionally includes an intermediate communication platform that includes cellular phone network interface.

In Example 14, the subject matter of one or any combination of Examples 1-12 optionally includes a telematics network as the intermediate platform.

Example 15 can include subject matter (such as a radio receiver) or can optionally be combined with one or any combination of Examples 1-14 to include such subject matter, comprising: radio frequency (RF) receiver circuitry configured to receive a radio broadcast signal that includes a digital audio file; an Internet network interface; a display; processing circuitry; and an application programming interface (API) including instructions for execution by the processing circuitry. The API is configured to: determine audio content recognition information using the digital audio file; send the audio content recognition information to an audio metadata service application via the Internet network interface; receive audio metadata associated with the digital audio file via the Internet network interface; and present information included in the metadata using the display.

In Example 16, the subject matter of Example 15 optionally includes an API configured to determine that audio metadata for audio content of the radio broadcast is unavailable, and initiate determining the audio content recognition information in response to determining that the audio metadata is unavailable.

In Example 17, the subject matter of one or both of Examples 15 and 16 optionally includes an API configured to: send one or both of geographical location information and radio station information with the audio content recognition information; receive now-playing information via the Internet network interface; and present current tuning information using the display using the received now-playing information.

In Example 18, the subject matter of one or any combination of Examples 15-17 optionally includes an API configured to: send one or both of geographical location information and radio station information with the audio content recognition information; receive a tuning recommendation in response to the sending of the information; and present the tuning recommendation using the display.

In Example 19, the subject matter of one or any combination of Examples 15-18 optionally includes a cellular phone network interface as the Internet network interface.

In Example 20, the subject matter of one or any combination of Examples 15-18 optionally includes a telematics network interface as the Internet network interface.

Example 21 includes subject matter (such as a computer readable storage medium including instructions that, when performed by processing circuitry of a first server, cause the processing circuitry to perform acts) or can optionally be combined with one or any combination of Examples 1-20 to include such subject matter, comprising: receiving audio content recognition information from a first radio receiver of multiple radio receivers via an intermediate communication platform that provides an interface to an Internet network, wherein the audio content recognition information identifies audio content received by the first receiver in a radio broadcast; determining audio metadata associated with the received audio content recognition information; and sending the audio metadata to the multiple radio receivers via the intermediate communication platform.

In Example 22, the subject matter of Example 21 optionally includes including instructions that cause the processing circuitry to perform acts comprising: receiving audio content recognition information from the first radio receiver that is located in an area receiving the radio broadcast; and sending the audio metadata to all receivers in the area receiving the radio broadcast.

In Example 23, the subject matter of one or both of Examples 21 and 22 optionally include instructions that cause the processing circuitry to perform acts comprising: forwarding the audio content recognition information to a second server via a communication network; and receiving the audio metadata from the second server.

In Example 24, the subject matter of one or any combination of Examples 21-23 optionally include instructions that cause the processing circuitry to record radio reception information for the audio content identified by the audio content recognition information.

These non-limiting examples can be combined in any permutation or combination. Many other variations than those described herein will be apparent from this document. For example, depending on the embodiment, certain acts, events, or functions of any of the methods and algorithms described herein can be performed in a different sequence, can be added, merged, or left out altogether (such that not all described acts or events are necessary for the practice of the methods and algorithms). Moreover, in certain embodiments, acts or events can be performed concurrently, such as through multi-threaded processing, interrupt processing, or multiple processors or processor cores or on other parallel architectures, rather than sequentially. In addition, different tasks or processes can be performed by different machines and computing systems that can function together.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The various illustrative logical blocks and modules described in connection with the embodiments disclosed herein can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Embodiments of the in-vehicle live guide generation system and method described herein are operational within numerous types of general purpose or special purpose computing system environments or configurations. In general, a computing environment can include any type of computer system, including, but not limited to, a computer system based on one or more microprocessors, a mainframe computer, a digital signal processor, a portable computing device, a personal organizer, a device controller, a computational engine within an appliance, a mobile phone, a desktop computer, a mobile computer, a tablet computer, a smartphone, and appliances with an embedded computer, to name a few.

Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, and so forth. In some embodiments the computing devices will include one or more processors. Each processor may be a specialized microprocessor, such as a digital signal processor (DSP), a very long instruction word (VLIW), or other micro-controller, or can be conventional central processing units (CPUs) having one or more processing cores, including specialized graphics processing unit (GPU)-based cores in a multi-core CPU.

The process actions or operations of a method, process, or algorithm described in connection with the embodiments disclosed herein can be embodied directly in hardware, in a software module executed by a processor, or in any combination of the two. The software module can be contained in computer-readable media that can be accessed by a computing device. The computer-readable media includes both volatile and nonvolatile media that is either removable, non-removable, or some combination thereof. The computer-readable media is used to store information such as computer-readable or computer-executable instructions, data structures, program modules, or other data. By way of example, and not limitation, computer readable media may comprise computer storage media and communication media.

Computer storage media includes, but is not limited to, computer or machine readable media or storage devices such as Blu-ray discs (BD), digital versatile discs (DVDs), compact discs (CDs), floppy disks, tape drives, hard drives, optical drives, solid state memory devices, RAM memory, ROM memory, EPROM memory, EEPROM memory, flash memory or other memory technology, magnetic cassettes, magnetic tapes, magnetic disk storage, or other magnetic storage devices, or any other device which can be used to store the desired information and which can be accessed by one or more computing devices.

A software module can reside in the RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an application specific integrated circuit (ASIC). The ASIC can reside in a user terminal. Alternatively, the processor and the storage medium can reside as discrete components in a user terminal.

The phrase "non-transitory" as used in this document means "enduring or long-lived". The phrase "non-transitory computer-readable media" includes any and all computer-readable media, with the sole exception of a transitory, propagating signal. This includes, by way of example and not limitation, non-transitory computer-readable media such as register memory, processor cache and random-access memory (RAM).

The phrase "audio signal" is a signal that is representative of a physical sound.

Retention of information such as computer-readable or computer-executable instructions, data structures, program modules, and so forth, can also be accomplished by using a variety of the communication media to encode one or more modulated data signals, electromagnetic waves (such as carrier waves), or other transport mechanisms or communications protocols, and includes any wired or wireless information delivery mechanism. In general, these communication media refer to a signal that has one or more of its characteristics set or changed in such a manner as to encode information or instructions in the signal. For example, communication media includes wired media such as a wired network or direct-wired connection carrying one or more modulated data signals, and wireless media such as acoustic, radio frequency (RF), infrared, laser, and other wireless media for transmitting, receiving, or both, one or more modulated data signals or electromagnetic waves. Combinations of the any of the above should also be included within the scope of communication media.

Further, one or any combination of software, programs, computer program products that embody some or all of the various embodiments of the in-vehicle live guide generation system and method described herein, or portions thereof, may be stored, received, transmitted, or read from any desired combination of computer or machine readable media or storage devices and communication media in the form of computer executable instructions or other data structures.

Embodiments of the in-vehicle live guide generation system and method described herein may be further described in the general context of computer-executable instructions, such as program modules, being executed by a computing device. Generally, program modules include routines, programs, objects, components, data structures, and so forth, which perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the scope of the disclosure. As will be recognized, certain embodiments of the inventions described herein can be embodied within a form that does not provide all of the features and benefits set forth herein, as some features can be used or practiced separately from others.

What is claimed is:

1. A system to provide audio metadata to radio receivers in real time, the system comprising:

an intermediate communication platform that provides an interface to an Internet network; and a first server including: a port operatively coupled to the intermediate communication platform, processing circuitry, and a service application for execution by the processor, wherein the service application is configured to:

receive first audio content recognition information from a first radio receiver of multiple radio receivers via the intei mediate communication platform, wherein the first audio content recognition information identifies audio content received by the first receiver in a first radio broadcast;

receive second audio content recognition information from at least one other radio receiver of the multiple radio receivers via the intermediate communication platform, wherein the second audio content recognition information identifies second audio content received by the second receiver in a second radio broadcast different from the first radio broadcast;

determine first audio metadata associated with the received first audio content recognition information and determine second audio metadata associated with the received second audio content recognition information; and send both the first and second audio metadata to each of the multiple radio receivers via the intermediate communication platform.

2. The system of claim 1, wherein the service application is configured to receive geographical location information from the first radio receiver, and the multiple radio receivers are radio receivers located in a same receiving area of the radio broadcast as the first radio receiver.

3. The system of claim 1, wherein the service application is configured to:

receive radio station information from the first and second radio receivers in association with the first and second audio content recognition information; and send audio metadata to each of the multiple radio receivers that includes now-playing information for multiple radio stations.

4. The system of claim 1, including:

a second server configured to store the audio metadata; and a communication network operatively coupled to the first and second servers;

wherein the service application of the first server is configured to determine the first and second audio metadata by forwarding the first and second audio content recognition information to the second server via the communication network and receive the first and second audio metadata from the second server.

5. The system of claim 1, wherein the first server includes a memory configured to store the first and second audio metadata, and the service application is configured to determine the first and second audio metadata by retrieving the first and second audio metadata from the memory using the first and second audio content recognition information.

6. The system of claim 1, wherein the service application is configured to determine audio metadata using audio content recognition information received from the multiple radio receivers according to a specified priority.

7. The system of claim 1, wherein the service application is configured to determine an end time of the audio content using the first audio content recognition information and change the first audio metadata sent to the multiple radio receivers based on the end time.

8. The system of claim 1, wherein the service application is configured to:

receive geographical location information from the first radio receiver;

determine signal strength using one or both of the received audio content recognition information and the received geographical location information; and send a tuning recommendation to the multiple radio receivers according to the determined signal strength.

9. The system of claim 1, wherein the first server includes a memory, and the service application is configured to use the memory to record radio reception information for the audio content identified by the first and second audio content recognition information.

10. The system of claim 9, wherein the service application is configured to record radio reception information including one or more of:

an identifier of the audio content;

a date of reception of the first and second audio content recognition information;

geographical location information of the first radio receiver; and radio station identification information.

11. The system of claim 1, wherein the first server includes a memory, and the service application is configured to use the memory to record radio receiver tuning information for the audio content identified by the first and second audio content recognition information.

12. The system of claim 1, wherein the service application is configured to send a tuning recommendation to the first radio receiver via the intermediate communication platform according to the radio receiver tuning information.

13. The system of claim 1, wherein the intermediate communication platform is a cellular phone network.

14. The system of claim 1, wherein the intermediate communication platform is a telematics network.

15. A radio receiver comprising:

radio frequency (RF) receiver circuitry configured to receive a radio broadcast signal that includes a digital audio file;

an Internet network interface;

a display;

processing circuitry; and an application programming interface (API) including instructions for execution by the processing circuitry, wherein the API is configured to:

determine audio content recognition information using the digital audio file;

send the audio content recognition information to an audio metadata service application via the Internet network interface;

receive first audio metadata associated with the digital audio file via the Internet network interface and additional audio metadata associated with at least one other radio broadcast to which the radio receiver is not tuned; and generate a broadcast radio program guide for display using information included in the first audio metadata and the additional audio metadata.

16. The radio receiver of claim 15, wherein the API is configured to:

determine that audio metadata for audio content of the radio broadcast signal is unavailable; and initiate determining the audio content recognition information in response to determining that the audio metadata is unavailable.

17. The radio receiver of claim 15, wherein the API is configured to:

send one or both of geographical location information and radio station information with the audio content recognition information;

receive now-playing information via the Internet network interface for the radio broadcast signal and the at least one other radio broadcast; and present current tuning information using the display using the received now-playing information.

18. The radio receiver of claim 15, wherein the API is configured to:

send one or both of geographical location information and radio station information with the audio content recognition information;

receive a tuning recommendation in response to the sending of the information; and present the tuning recommendation using the display.

19. The radio receiver of claim 15, wherein the Internet network interface is a cellular phone network interface.

20. The radio receiver of claim 15, wherein the Internet network interface is a telematics network interface.

21. A non-transitory computer readable storage medium including instructions that, when performed by processing circuitry of a first server, cause the processing circuitry to perform acts comprising:

receiving first audio content recognition information from a first radio receiver of multiple radio receivers via an intermediate communication platform that provides an interface to an Internet network, wherein the first audio content recognition information identifies audio content received by the first receiver in a first radio broadcast;

receiving second audio content recognition information from at least one other radio receiver of the multiple radio receivers via the intermediate communication platform, wherein the second audio content recognition information identifies second audio content received by the second receiver in a second radio broadcast different from the first radio broadcast;

determining audio metadata associated with the received first audio content recognition information and determine second audio metadata associated with the received second audio content recognition information; and sending both the first and second audio metadata to each of the multiple radio receivers via the intermediate communication platform.

22. The non-transitory computer readable storage medium of claim 21, including instructions that cause the processing circuitry to perform acts comprising:

receiving the first and second audio content recognition information from the first and second radio receivers that are located in an area receiving the first and second radio broadcasts; and sending the first and second audio metadata to all receivers in the area receiving the first and second radio broadcasts.

23. The non-transitory computer readable storage medium of claim 21, including instructions that cause the processing circuitry to perfoi ni acts comprising:

forwarding the first and second audio content recognition information to a second server via. a communication network; and receiving the first and second audio metadata from the second server.

24. The non-transitory computer readable storage medium of claim 21, including instructions that cause the processing circuitry to record radio reception information for the audio content identified by the first and second audio content recognition information.

* * * * *